United States Patent [19]

Gancedo

[11] Patent Number: 5,731,052
[45] Date of Patent: Mar. 24, 1998

[54] SUBSTANTIALLY RIGID THERMALLY INSULATING PANEL AND METHOD FOR MANUFACTURING IT

[75] Inventor: Valentin Menendez Gancedo, Roses, Spain

[73] Assignee: Zodiac International, Issy Les Moulineaux, France

[21] Appl. No.: 681,423

[22] Filed: Jul. 23, 1996

[30] Foreign Application Priority Data

Jul. 27, 1995 [EP] European Pat. Off. ............. 95401784

[51] Int. Cl.$^6$ ............................................... B65D 90/08
[52] U.S. Cl. .................... 428/35.8; 428/36.1; 428/36.8; 428/119; 220/6; 220/7; 220/420; 220/469; 220/DIG. 9; 206/524.2
[58] Field of Search ............................ 428/35.8, 36.1, 428/36.8, 119; 220/6, 7, 420, 469, DIG. 9; 206/524.2

[56] References Cited

U.S. PATENT DOCUMENTS

| | | | |
|---|---|---|---|
| 3,616,126 | 10/1971 | Tungseth | 161/53 |
| 4,230,057 | 10/1980 | Kurz. | |
| 4,502,153 | 3/1985 | Lapedes et al. | |
| 4,582,734 | 4/1986 | Miller | 428/12 |
| 4,645,704 | 2/1987 | Hellwig. | |
| 5,080,306 | 1/1992 | Porter et al. | |
| 5,399,408 | 3/1995 | Nowara | 428/73 |
| 5,466,506 | 11/1995 | Freitas et al. | 428/105 |
| 5,543,194 | 8/1996 | Rudy | 428/69 |

FOREIGN PATENT DOCUMENTS

| | | |
|---|---|---|
| 194 564A3 | 3/1986 | European Pat. Off. . |
| 526 363 A2 | 7/1992 | European Pat. Off. . |
| 2075 913 A | 11/1981 | United Kingdom . |
| WO-A 92 03284 | 3/1992 | WIPO . |

OTHER PUBLICATIONS

JP 63227336 Oike Kogyo KK Japan, Abstract Only.
JP 5156543 Teijin Ltd., Japan, Abstract Only.

*Primary Examiner*—Kathleen Choi
*Attorney, Agent, or Firm*—Larson & Taylor

[57] ABSTRACT

Rigid thermally insulating panel (1) which consists of at least two flexible composite sheets (2) spaced apart by a great number of flexible strands (3) arranged so that in the inflated state the two composite sheets (2) are held apart and in predetermined positions one with respect to the other, each composite sheet (2) comprising, from the center toward the outside: a protective internal sheet (4), transparent to electromagnetic waves, a thin sheet (5) of a metal reflecting electromagnetic waves, a layer (6) for protecting the metal sheet, a fibrous layer (7) providing the sheet with mechanical strength, a layer (8) of a coating polymer providing proofing, a layer (9) for protecting an underlying metal sheet, a thin sheet (10) of a metal reflecting electromagnetic waves, and a protective outer layer (11) transparent to electromagnetic waves.

14 Claims, 1 Drawing Sheet

SUBSTANTIALLY RIGID THERMALLY INSULATING PANEL AND METHOD FOR MANUFACTURING IT

The present invention relates to improvements made to thermally insulating structures, such as those intended, for example, to form isothermal containers.

Numerous thermally insulating structures making it possible to form isothermal containers are currently known. However, all the known containers have the drawback of having a rigid structure made of metal or of plastic and they therefore have a weight which seems to be too high for some fields of use in which the quest for minimum weight is a fundamental objective (refrigerating containers on board spacecraft, for example).

There is therefore a continuing and pressing demand for isothermal structures which are intended especially to be used in conditions in which the movements of gas convection cannot take place (zero-gravity environment), which are at least as effective as the conventional structures from the thermal insulation point of view but which in addition have a considerably lower weight, for example at least five times less than the lightest currently known structures made of aluminum.

To these ends, according to a first of its aspects, the invention proposes a rigid thermally insulating panel which essentially consists of at least two substantially flexible composite sheets spaced apart by a great number of flexible strands arranged so that in the inflated state the two composite sheets are held apart and in predetermined positions one with respect to the other, each composite sheet comprising, from the center toward the outside:

a protective internal sheet, transparent to electromagnetic waves, especially infrared waves, a thin sheet of a metal reflecting electromagnetic waves, especially infrared waves, a layer for protecting the metal sheet, a fibrous layer providing the sheet with mechanical strength, a layer of a coating polymer providing proofing, a layer for protecting an underlying metal sheet, a thin sheet of a metal reflecting electromagnetic waves, especially infrared waves, and a protective outer layer transparent to electromagnetic waves, especially infrared waves.

By virtue of the aforementioned structure, a panel composed exclusively of very lightweight materials in which the metal sheets constitute an excellent thermal barrier is produced; the mechanical rigidity is afforded by inflation, to a relatively high pressure (for example of the order of 250 hectopascals) of the central empty space through which the flexible strands pass and the rigidity of such a structure is comparable with that of a panel made of a rigid material, metal or plastic. As far as the lightness of the weight is concerned, it may be observed that in a typical embodiment of a thermally insulating container, the weight is of the order of 5 kg whereas a comparable container constructed from aluminum in the conventional way weighs approximately 35 kg.

Advantageously, in order to obtain a structure which has good mechanical strength, the flexible strands pass through the fibrous layer and the ends of the flexible strands are held in the layer of coating polymer; and then, for preference, in order to achieve good anchorage, the flexible strands consist of at least one continuous flexible filament bend into a zigzag from one flexible sheet to the other and forming, on each side, loops through which weft filaments pass, the loops and the weft filaments being embedded in the layer of the coating polymer.

In a practical way, the protective layers consist of a polyimide, such as the one marketed under the name "CAPTON", and/or the coating polymer is a thermoplastic synthetic rubber such as the one marketed under the name "NEOPRENE". As a preference, the metal sheet is made of aluminum or of silver. As far as the fibrous layer is concerned, it may be woven or nonwoven, but it is preferably flame-retarded.

In a second of its aspects, the invention also proposes a method for producing a thermally insulating structure which includes several panels inclined with respect to each other in order to form a container, closed or otherwise, and which employs the construction explained above. Said method is essentially one which comprises the following steps:

a first flattened-out form of said structure is produced, by joining together a protective internal layer transparent to electromagnetic waves, especially infrared waves, a thin sheet of a metal reflecting electromagnetic waves, especially infrared waves, a layer for protecting the metal sheet, and a fibrous layer providing the mechanical strength, a second flattened-out form having the same configuration as the first form, but with the layers in reverse order is produced, the two forms are superimposed some distance apart, the protective internal layers facing one another, and a great number of flexible ties are put in place between the two forms, the flexible ties being held beyond the fibrous layers providing the mechanical strength, leaving spaces at the sites of future folds, a proofing layer of a coating polymer is deposited on each fibrous layer, thereby embedding the ends of the aforementioned flexible ties therein, each layer is covered with a protective layer, then with a thin sheet of a metal reflecting electromagnetic waves, especially infrared waves, the composite flat sheet thus constructed is folded by panels and the adjacent edges of said panels are joined together in order to obtain an intermediate structure, and finally the intermediate structure is covered on the inside and on the outside with two respective protective layers which are transparent to electromagnetic waves, especially infrared waves.

In order to improve the mechanical rigidity of the structure, external and/or internal corner reinforcements may then be attached.

For preference, in order to produce a great number of flexible ties, at least one filament is woven in an approximately zigzag configuration, thereby forming, beyond the fibrous layers, loops through which at least one weft filament passes, the respective loops and weft filaments being embedded in the corresponding layers of coating polymer.

BRIEF DESCRIPTION OF THE DRAWINGS

The invention will be better understood from reading the detailed description which follows of a few embodiments given solely without implied limitation. In this description, reference is made to the attached drawing in which.

Figure 1:
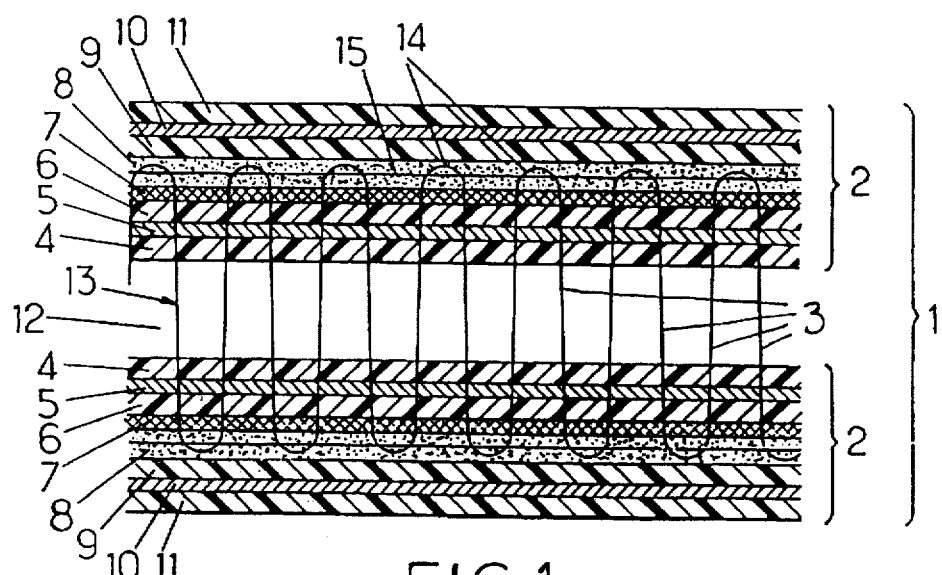
FIG. 1 is a diagrammatic sectional view illustrating the construction of a thermally insulating panel constructed in accordance with the invention.

Referring first of all to FIG. 1, a substantially rigid thermally insulating panel i consists of two substantially flexible composite sheets 2 spaced apart by a great number of flexible strands 3 arranged so that in the inflated state the two composite sheets 2 are held in predetermined positions one with respect to the other, especially are substantially parallel to one another.

Each composite sheet 2 comprises, from the center toward the outside:

- a protective internal layer 4 transparent to electromagnetic waves, especially to infrared waves; this internal layer may consist of a polyimide, such as the one available on the market under the name CAPTON;
- a thin sheet 5 of a metal, such as aluminum or silver, reflecting electromagnetic waves, especially infrared waves;
- a layer 6 for protecting the metal sheet 5, it being possible for the protective layer 6 to be constructed in the same way as the abovementioned layer 4;
- a fibrous layer 7 providing the composite sheet 2 with mechanical strength, it being possible for this fibrous layer to be woven or nonwoven, it preferably being flame-retarded;
- a layer 8 of a coating polymer such as a thermoplastic synthetic rubber ( for example the one available on the market under the name NEOPRENE) providing proofing;
- a layer 9 for protecting an underlying metal sheet, it being possible for this layer 9 to be constructed in the same way as the abovementioned layer 6;
- a thin sheet 10 of a metal reflecting electromagnetic waves, especially infrared waves, and which may be constructed in exactly the same way as the aforementioned metal sheet 5; and
- a protective outer layer 11, transparent to electromagnetic waves, especially infrared waves, it being possible for this layer to be constructed in exactly the same way as the aforementioned internal layer 4.

The flexible spacing strands 3, which run through the empty space 12 separating the two composite sheets 2, pass through the fibrous layer 7 and the ends of said strands 3 are held in the layer 8 of coating polymer. The flexible strands may consist of at least one continuous flexible filament 13 bent into a zigzag from one sheet 2 to the other alternately, thereby forming, within each sheet 2, loops 14 through which at least one weft filament 15 passes. The loops 14 and the weft filaments 15 are embedded in the layer of coating polymer 7 and are anchored therein.

Once inflated by blowing a gas under pressure (for example of the order of 250 hectopascals) into the intermediate space 12, a panel with a great mechanical rigidity, comparable with that of a panel made of metal or of plastic and which constitutes a very good thermal insulator because of the presence of the multiple metal sheets and of the intermediate space is obtained. The use of such a panel in zero-gravity conditions leads to the absence of convection of the filling gas in the intermediate space 12 and contributes to the quality of the thermal insulation.

Figure 3:
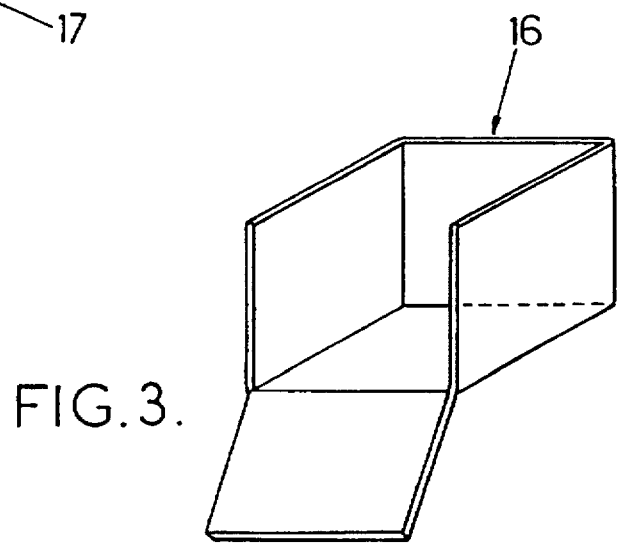
FIG. 3 shows, in perspective, a thermally insulating container obtained, from flattened-out forms of FIG. 2, on completion of the method of the invention.

In order to produce an isothermal container of parallelepipedal shape, such as the cube-shaped container 16 shown in FIG. 3 (the container being open upward and having a removable lid which has not been represented, the front face being hinged), it is possible to resort to the method which follows and which can be employed in order to obtain containers of any desired shape other than the one represented by way of purely illustrative example.

Figure 2:
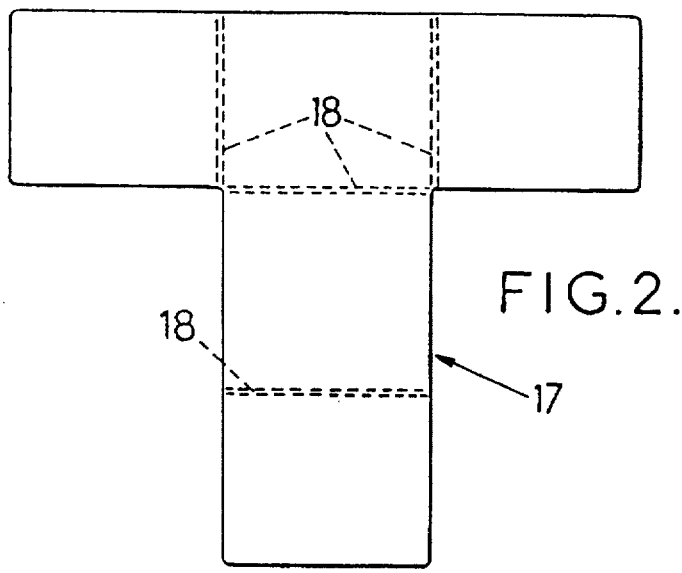
FIG. 2 shows a flattened-out form produced in an intermediate step of the method of the invention.

First of all, a first flattened-out form 17 (FIG. 2) of the desired structure is produced by securing together, after cutting out along the desired outline:

- the aforementioned protective internal layer 4 transparent to electromagnetic waves, especially infrared waves,
- the aforementioned thin sheet 5 of a metal reflecting electromagnetic waves, especially infrared waves,
- the aforementioned layer 6 for protecting the metal sheet 5, and
- the aforementioned fibrous layer 7 intended to provide the mechanical strength.

A second flattened-out form having the same configuration as the first one 17, but with the layers in reverse order (in the example represented in FIG. 2, the symmetry of the first and second shapes means that two identical forms are produced) is also produced.

The first and second forms are then superimposed, keeping them some distance apart, the two respective internal layers 4 facing each other. Then a great number of flexible ties 3 are arranged between the two forms, the flexible ties 3 being fixed or held to or beyond the fibrous layer 7, providing gaps at the sites of the future folds (18) of the definitive structure. Advantageously and in a simple way, at least one filament 13 or a series of filaments 13 are woven in a zigzag configuration, each time passing through the fibrous layers 7 and forming, beyond them, loops 14 through which one or more weft filaments 15 pass.

Each fibrous layer 7 is then covered with a proofing layer 8 of a coating polymer as mentioned earlier, in which the loops 14 and the weft filaments 15 are embedded so that the filaments 13, and therefore the ties 3 are anchored securely in said layers 8 after polymerization.

After the layers 8 have been polymerized, a protective layer 9 then a metal sheet 10 are deposited on each of them.

The composite flat sheet thus constructed is then folded along the previously defined gaps 18, then the adjacent edges of the panels are joined together, especially by bonding, in order to obtain an intermediate structure which has the desired configuration.

Finally, all the inside and outside faces as well as the folds of the intermediate structure are covered with a protective external layer 11 as stated earlier. The final structure may be reinforced by fitting external and/or internal corner reinforcements.

The lid of the structure 17 of FIG. 3 may be manufactured more simply using the same sequence of steps.

As goes without saying, and as is already obvious from the foregoing, the invention is not in any way limited to those of its applications and embodiments which have been more specifically envisaged; on the contrary it encompasses all variations thereof. In particular, it will be understood that the invention is not limited to the production of panels with two spaced-apart composite sheets but may extend to the production of panels having a great many composite sheets spaced apart one after the other.

I claim:

1. A substantially rigid thermally insulating panel (1) which consists of at least two substantially flexible composite sheets (2) spaced apart by a great number of flexible strands (3) arranged so that in the inflated state the two composite sheets (2) are held apart and in predetermined positions one with respect to the other, each composite sheet (2) comprising, from the center toward the outside:

a protective internal sheet (4), transparent to electromagnetic waves, especially infrared waves, a thin sheet (5) of a metal reflecting electromagnetic waves, a layer (6) for protecting the metal sheet, a fibrous layer (7) providing the sheet with mechanical strength, a layer (8) of a coating polymer providing proofing, a layer (9) for protecting an underlying metal sheet, a thin sheet (10) of a metal reflecting electromagnetic waves, and a protective outer layer (11) transparent to electromagnetic waves, by virtue of all of which, after the empty space (12) separating the two composite sheets (2) and through which a great/number of flexible strands (3) pass is inflated under pressure, a thermally insulating rigid panel with very high efficiency is formed.

2. The panel as claimed in claim 1, wherein the flexible strands (3) having ends pass through the fibrous layer (7) and the ends of the flexible strands are held in the layer (8) of coating polymer.

3. The panel as claimed in claim 2, wherein the flexible strands (3) consist of at least one continuous flexible filament (3) bend into a zigzag from one flexible sheet to the other and forming, on each side, loops (14) through which at least one weft filament (15) passes, the loops and the weft filaments being embedded in the layer (8) of the coating polymer.

4. The panel as claimed in claim 1, wherein the protective layers consist of a polyimide.

5. The panel as claimed in claim 1, wherein the metal sheet is made of aluminum or of silver.

6. The panel as claimed in claim 1, wherein the coating polymer is a thermoplastic synthetic rubber.

7. The panel as claimed in claim 1, wherein the fibrous layer (7) is woven.

8. The panel as claimed in claim 1, wherein the fibrous layer (7) is nonwoven.

9. The panel as claimed in claim 1, wherein the fibrous layer (7) is flame retarded.

10. A method for producing a thermally insulating structure constructed as claimed in claim 1, including several panels inclined with respect to each other, which method comprises the following steps:

a first flattened-out form (17) of said structure is produced, by joining together a protective internal layer (4) transparent to electromagnetic waves, a thin sheet (5) of a metal reflecting electromagnetic waves, a layer (6) for protecting the metal sheet, and a fibrous layer (7) providing the mechanical strength, a second flattened-out form having the same configuration as the first form, but with the layers in reverse order is produced, the two forms are superimposed some distance apart, the protective internal layers (4) facing one another, and a great number of flexible ties (3) are put in place between the two forms, the flexible ties being held beyond the fibrous layers (7), leaving spaces at the sites (18) of future folds, a proofing layer (8) of a coating polymer is deposited on each fibrous layer (7), thereby embedding the ends of the aforementioned flexible ties (3) therein, each layer is covered with a layer (9) for protecting a metal sheet, then with a thin sheet (10) of a metal reflecting electromagnetic waves, the composite flat sheet thus constructed is folded by panels and the adjacent edges of said panels are joined together in order to obtain an intermediate structure, and finally the intermediate structure is covered on the inside and on the outside with two respective protective layers (11) which are transparent to electromagnetic waves.

11. The method as claimed in claim 10, wherein external and/or internal corner reinforcements are then attached.

12. The method as claimed in claim 10, wherein, in order to produce a great number of flexible ties (3), at least one filament (13) is woven in an approximately zigzag configuration, thereby forming, beyond the fibrous layers, loops (14) through which at least one weft filament (15) passes, the respective loops and weft filaments being embedded in the layers of coating polymer.

13. A method as claimed in claim 1 wherein the electromagnetic waves are infrared waves.

14. A method as claimed in claim 10 wherein the electromagnetic waves are infrared waves.

* * * * *